(12) United States Patent
Cheung (10) Patent No.: US 8,374,949 B2
(45) Date of Patent: Feb. 12, 2013

(54) INTEGRATION OF OPEN ADVERTISEMENTS WITH E-COMMERCE ACTIVITIES

(75) Inventor: Kyle Cheung, Wong Tai Sin (HK)

(73) Assignee: Yahoo! Inc., Sunnyvale, CA (US)

( * ) Notice: Subject to any disclaimer, the term of this patent is extended or adjusted under 35 U.S.C. 154(b) by 608 days.

(21) Appl. No.: 12/239,310

(22) Filed: Sep. 26, 2008

(65) Prior Publication Data

US 2010/0082472 A1 Apr. 1, 2010

(51) Int. Cl.
*G06Q 40/00* (2012.01)
(52) U.S. Cl. .............. 705/37; 705/27.1; 705/26.3; 705/5
(58) Field of Classification Search .................... 705/37, 705/27.1, 26.3, 5
See application file for complete search history.

(56) References Cited

U.S. PATENT DOCUMENTS

| | | |
|---|---|---|
| 6,014,090 A | 1/2000 | Rosen et al. |
| 6,415,270 B1 | 7/2002 | Rackson et al. |
| 6,925,446 B2 | 8/2005 | Watanabe |
| 7,023,979 B1 | 4/2006 | Wu et al. |
| 7,047,210 B1 | 5/2006 | Srinivasan |
| 7,107,227 B1 | 9/2006 | Bezos et al. |
| 7,269,253 B1 | 9/2007 | Wu et al. |
| 7,296,033 B1 | 11/2007 | Lynch |
| 7,372,952 B1 | 5/2008 | Wu et al. |
| 2008/0059327 A1 | 3/2008 | Bloomfield |

FOREIGN PATENT DOCUMENTS

| | | |
|---|---|---|
| KR | 10-2003-0019307 A | 3/2003 |
| KR | 10-2007-0023940 A | 3/2007 |
| WO | WO 01/56252 A2 | 8/2001 |

OTHER PUBLICATIONS

International Search Report and Written Opinion, International Application No. PCT/US2009/055918, dated Apr. 9, 2010 (12 pages.).
"About Us," Asia Pacific Auction Centre, retrieved Sep. 26, 2008, from http://www.apac.com.my/About_Us.html (1 page).
"Developer Center Widgets," eBay Developers Program, retrieved Sep. 26, 2008, from http://developer.ebay.com/developercenter/javascript/widgets/ (1 page).
KIPO's Notice of Preliminary Rejection (English Translation) for Korean Patent Application No. 10-2011-7009396, dated Jul. 18, 2012 (11 pages).

*Primary Examiner* — Daniel Felten
(74) *Attorney, Agent, or Firm* — Nathan O. Greene; Brinks Hofer Gilson & Lione (57) ABSTRACT

A method is disclosed for integration of open advertisements with targeted websites, including enabling a seller to place a product on auction through an auction website, wherein an auction server creates an auction listing for the product together with a first software code affiliated with the auction listing; marking the first software code to function with a targeted website in response to the seller requesting an open advertisement of the auction listing; receiving a call of the software code from a targeted website server; generating a second software code with the first software code, wherein the second software code includes a product identification to provide access to the auction server; and sending the second software code to the targeted website server, the second software code configured to create the open advertisement that displays specific information related to the auction listing to be served to an advertisement position of the targeted website.

19 Claims, 9 Drawing Sheets

INTEGRATION OF OPEN ADVERTISEMENTS WITH E-COMMERCE ACTIVITIES

BACKGROUND

1. Technical Field

The disclosed embodiments relate to the integration of open advertisements from online auctions with other e-commerce activities, and more particularly to the integration of open advertisements related to auction listings with targeted websites and with search results pages.

2. Related Art

Electronic commerce, or e-commerce, consists of the buying and selling of products or services over electronic systems such as the Internet and other computer networks. The amount of trade conducted electronically has grown extraordinarily since the spread of the Internet. A wide variety of commerce is conducted in this way, spurring and drawing on innovations in electronic funds transfer, supply chain management, Internet marketing, online transaction processing, electronic data interchange (EDI), inventory management systems, and automated data collection systems. Modem electronic commerce, or e-commerce, typically uses the World Wide Web ("Web") at least at some point in the transaction's lifecycle, although it can encompass a wider range of technologies such as e-mail as well.

A large percentage of e-commerce is conducted entirely electronically for virtual items such as access to premium content on a website, but most e-commerce involves the transportation of physical items in some way. Online retailers are sometimes known as e-tailers and online retail is sometimes known as e-tail. Almost all big retailers have electronic commerce presence on the Web.

Online auctions are increasing in popularity, which include Yahoo!, eBay, Ubid, Overstock, etc. The auction sites for Yahoo! currently include those in Hong Kong, Singapore, and Taiwan. Another increasingly popular auction site is that for Asian Pacific Auction Centre (APAC), which includes global marketing that brings together buyers and sellers. That is, the APAC site provides to its sellers opportunities to also be advertisers of their goods in a system that identifies goods to be sold and unites buyers and sellers in purchasing arrangements.

Internet advertising is also a multi-billion dollar industry and is growing at double digits rates in recent years. It is also the major revenue source for Internet companies, such as Yahoo! of Sunnyvale, Calif. or Google of Mountain View, Calif., which provide advertising networks that connect advertisers, publishers, and Internet users. A major portion of revenue has historically comes from sponsored search advertisements and other advertising related to conducting search through search engines, for instance. Another major source of revenue includes serving display advertisements to Web pages that include content matching material related to the advertisement. These Web pages may be located with an affiliate network such as created or hosted by Yahoo! or Google, or may be third party websites that exist outside of a network of such service providers. No online search or advertising company, however, has integrated open advertisements created to promote online auction listings through affiliate or third party websites, or through search results pages from its search marketing systems.

SUMMARY

By way of introduction, the embodiments described below are drawn to the integration of open advertisements from online auctions with other e-commerce activities, and more particularly to the integration of open advertisements related to auction listings with targeted websites and with search results pages.

In a first aspect, a computer-implemented method is disclosed for integration of open advertisements with targeted websites, including enabling a seller, over a network with an online auction server, to place a product on auction through an auction website, wherein the auction server creates an auction listing for the product together with a first software code affiliated with the auction listing; marking the first software code to function with a targeted website in response to the seller requesting an open advertisement of the auction listing; receiving a call of the software code from a targeted website server that hosts the targeted website; generating a second software code with the first software code, wherein the second software code includes an auction product identification to provide access to the auction server; and sending the second software code to the targeted website server, wherein the second software code is configured to create the open advertisement that displays specific information related to the auction listing to be served to an advertisement position of the targeted website.

In a second aspect, a computer-implemented method is disclosed for integration of open advertisements with search marketing, including enabling a seller, over a network with an online auction server, to place a product on auction through an auction website, wherein the auction server creates an auction listing for the product; enabling the seller, through the auction server, to request an open advertisement to promote the auction listing through a search marketing ad server, which serves advertisements to search results pages; creating a first software code by the auction server to be affiliated with the auction listing; receiving a call of the first software code from the search marketing ad server; generating a second software with the first software code, wherein the second software code includes an auction product identification to provide access to the auction server; and sending the second software code to the search marketing ad server, wherein the second software code is configured to create the open advertisement that displays specific information to be served to an advertisement position of a search results page in response to a search query.

In a third aspect, a computer-implemented method is disclosed for integration of open advertisements with search marketing, including authenticating access of an auction seller to a search marketing ad server by verifying a user identification (USERID) and password created during a process of creating an auction listing of a product through an online auction server; receiving, by the search marketing ad server from the seller, information requested to create an open advertisement to promote the auction listing on search results pages, wherein the information comprises a bid uniform resource locator (URL) that links to the auction listing, a keyword relevant to the product being auctioned, and a method of being charged; and serving, by the search marketing ad server, the open advertisement to a position of a search results page returned in response to a search by a potential bidder for the keyword.

In a fourth aspect, a system is disclosed for integration of open advertisements with targeted websites, including an online auction server to enable a seller, over a network, to place a product on auction through an auction website, wherein the auction server creates an auction listing for the product, the auction server including. The system includes a memory, a processor coupled with the memory, a communication interface coupled with the processor and the memory, and a software code generator coupled with the processor and configured to create a remotely-executable first software code in response to the creation of an auction listing for the product. The communication interface receives a call of the first software code from a targeted website server that hosts a targeted website. The processor is configured to generate a second software code with the first software code, wherein the second software code includes an auction product identification (ID) to provide access to the auction server. The communication interface sends the second software code to the targeted website server, wherein the second software code is configured to create the open advertisement that displays specific information related to the auction listing to be served to an advertisement position of the targeted website.

In a fifth aspect, a system is disclosed for integration of open advertisements with search marketing, including an online auction server to enable a seller, over a network, to place a product on auction through an auction website. The auction server creates an auction listing for the product, the auction server including: a memory, a processor coupled with the memory, a communication interface coupled with the processor and the memory, and a software code generator coupled with the processor and configured to create a first software code in response to the creation of an auction listing for the product. The processor and the communication interface are configured to enable the seller to request an open advertisement to promote the auction listing through a search marketing ad server, which serves advertisements to search results pages, wherein the software code generator creates the first software code to be affiliated with the auction listing. The communication interface receives a call of the first software code from the search marketing ad server, and the processor is configured to generate a second software code with the first software code, wherein the second software code includes an auction product identification (ID) to provide access to the auction server. The communication interface sends the second software code together with the product ID to the search marketing ad server, wherein the second software code is configured to create the open advertisement that displays specific information to be served to an advertisement position of a search results page in response to a search query.

In a sixth aspect, a system is disclosed for integration of open advertisements with search marketing, including a search marketing ad server to authenticate access of an auction seller by verifying a user identification (USERID) and password created during a process of creating an auction listing of a product through an online auction server. The search marketing ad server includes a memory, a processor coupled with the memory, a communication interface coupled with the processor, and an advertisement deliverer coupled with the processor and the communication interface. The communication interface receives from the seller information requested to create an open advertisement to promote the auction listing on search results pages, wherein the information comprises a bid uniform resource locator (URL) that links to the auction listing, a keyword relevant to the product being auctioned, and a method of being charged. The advertisement deliverer serves the open advertisement to a position of a search results page returned in response to a search by a potential bidder for the keyword.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

By way of introduction, the disclosed embodiments relate to the integration of open advertisements from online auctions with other e-commerce activities, and more particularly to the integration of open advertisements related to auction listings with targeted websites and with search results pages. The integration of open advertisements with targeted websites and search results pages of online search pages allows auction sellers to better promote their products to thereby increase bidder interest, driving up final sales amounts on auctioned goods. The term "open advertisement" means an advertisement of an auctioned product or service for which open, public access to bidding is available for all potential bidders. Also, it is "open" for any seller to advertise their product on search result pages and other third party web pages through the open advertisements. In the present context, potential bidders may include any searchers of the Internet or the World Wide Web ("Web") to whom may be served advertisements on Web pages delivered to their browsers while searching or browsing.

Figure 1:
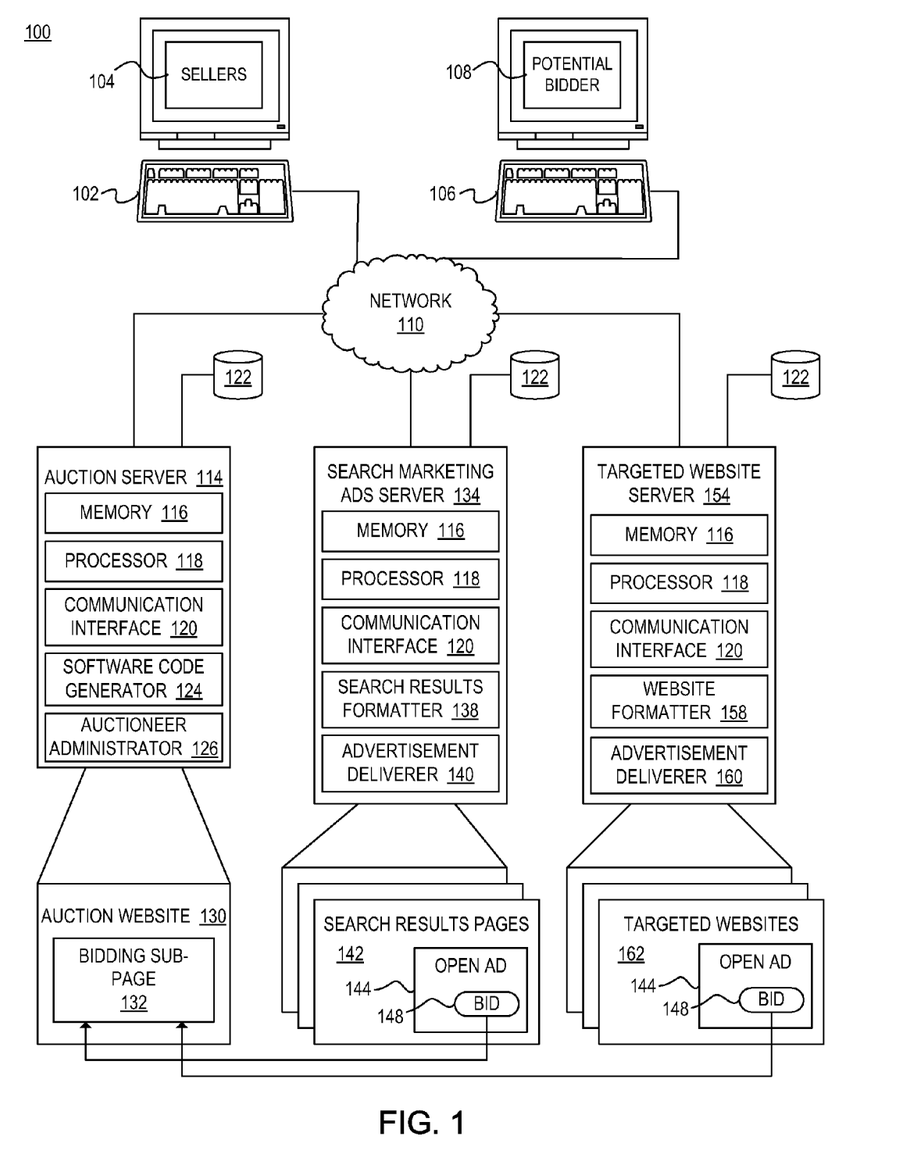
FIG. 1 is a diagram of an exemplary system for integrating open advertisements to promote auction listings in other e-commerce activities, such as through targeted websites or through search results pages of ad marketing search.

FIG. 1 is a diagram of an exemplary system 100 for integrating open advertisements to promote auction listings in other e-commerce activities, such as through targeted websites or through search results pages of ad marketing search. The system 100 may include a plurality of seller machines 102 having seller browsers 104, and a plurality of potential bidder machines 106 having potential bidder browsers 108, both of which communicate over a network 110. The network 110 may include the Internet or World Wide Web ("Web"), a wide area network (WAN), a local area network ("LAN"), and/or an extranet, to which may be connected through either a wired or wireless connection. The potential bidder and seller machines 106, 102 may include any networked-enabled computing device, and therefore, is not limited to a personal computer, but may include a personal digital assistant (PDA), a cell phone, laptop, or other mobile device, etc.

The system 100 may further include an auction server 114 having a memory 116, a processor 118, a communication interface 120, a database 122, a software code generator 124, and an auctioneer administrator 126. The auction server 114 is configured to produce an auction website 130 having a bidding sub-page 132 for potential bidders to access to bid on products of sellers over the network 110.

The system 100 may further include a search marketing ads server 134 having a memory 116, a processor 118, a communication interface 120, a database 122, a search results formatter 138, and an advertisement (ad) deliverer 140. The search marketing ads server 134 may interface, or otherwise be integrated, with a search engine (not shown), and be configured to serve any number of advertisements to search results pages 142. The advertisements may include sponsored advertisements paid for by advertisers, and particular to this application, an open advertisement 144 including an auction bid link 148 (or other selectable hyperlink indicia) requested by sellers.

The system 100 may further include a targeted website server 154 having a memory 116, a processor 118, a communication interface 120, a database 122, a website formatter 158, and an advertisement (ad) deliverer 160. The targeted website server 154 is configured to produce targeted websites 162, and to serve any number of advertisements to the targeted websites 162. The advertisements may include sponsored advertisements, and particular to this application, an open advertisement 144 including an auction bid link 148. The auction bid link 148, when selected by potential bidders through browsers 108 of the potential bidder machines 106, redirect the potential bidders through the network 110 to the bidding sub-page 132 of the auction website 130 where the potential bidders may bid on an auctioned product being advertised in the open advertisement 144.

The auction server 114, the search marketing ads server 134, and the targeted website server 154 may be coupled with each other with a local connection, or remotely over the network 110. Herein, the phrase "coupled with" is defined to mean directly connected to or indirectly connected through one or more intermediate components.

A seller may place a product on auction to sell it by accessing the auction server 114 over the network 110. Once the seller, from the seller browser 108, signs up for an auction of a product, the auction server 114 creates an auction listing to list that product on the auction website 130. While the auction website 130 may provide a limited amount of advertising for the auction fee it charges the potential bidder, exposure to potential bidders is limited because not everyone that may be interested in the auction would know that the product is being sold, or that they could bid on the product through the auction website 130.

A seller, therefore, through the embodiments disclosed herein, may achieve quick, seamless advertising that would reach a greater audience of potential bidders by accessing services of the search marketing ads server 134 and/or the targeted website server 154 provided to serve the open advertisement 144 to a number of possible targeted websites (162) or search results pages (142). To facilitate this process, the auction server 114, through its software code generator 124, creates an application programming interface (API) code (or other remotely-executable software code) at the time the seller creates the auction listing and chooses to advertise outside of the auction website 130. At a time of registration of the seller, the auction server 114 will also provide to a seller a user identification (USERID) and/or password that the communication interface 120 may use to authenticate access to the auction server 114.

The API code, which will be discussed in more detail below, may be created to be specific to one or more products, which may or may not be associated with one or more keywords. Other software code or scripting that may be executed through a remote procedure call (RPC) may be used; accordingly, the API code referred to herein is exemplary only and should not be construed to limit the types of software code used, which may include any type of software code configured to deliver scripting (or self-executable) code that may be used to generate the open advertisements 144. Accordingly, the API code, as used herein, is understood to include any remotely-executable software code. An RPC is sometimes referred to as a remote server call. The API or other code, additionally, may be activated when called by a remote source when that source seeks to serve an open advertisement 144 affiliated with one or more auctioned products. The server-side code on the auction server 114 that gets invoked from a client, such as the search marketing ads server 134 or the targeted website server 154, may also be referred to as a service. The act of making a RPC is sometimes referred to as invoking a service.

Figure 2:
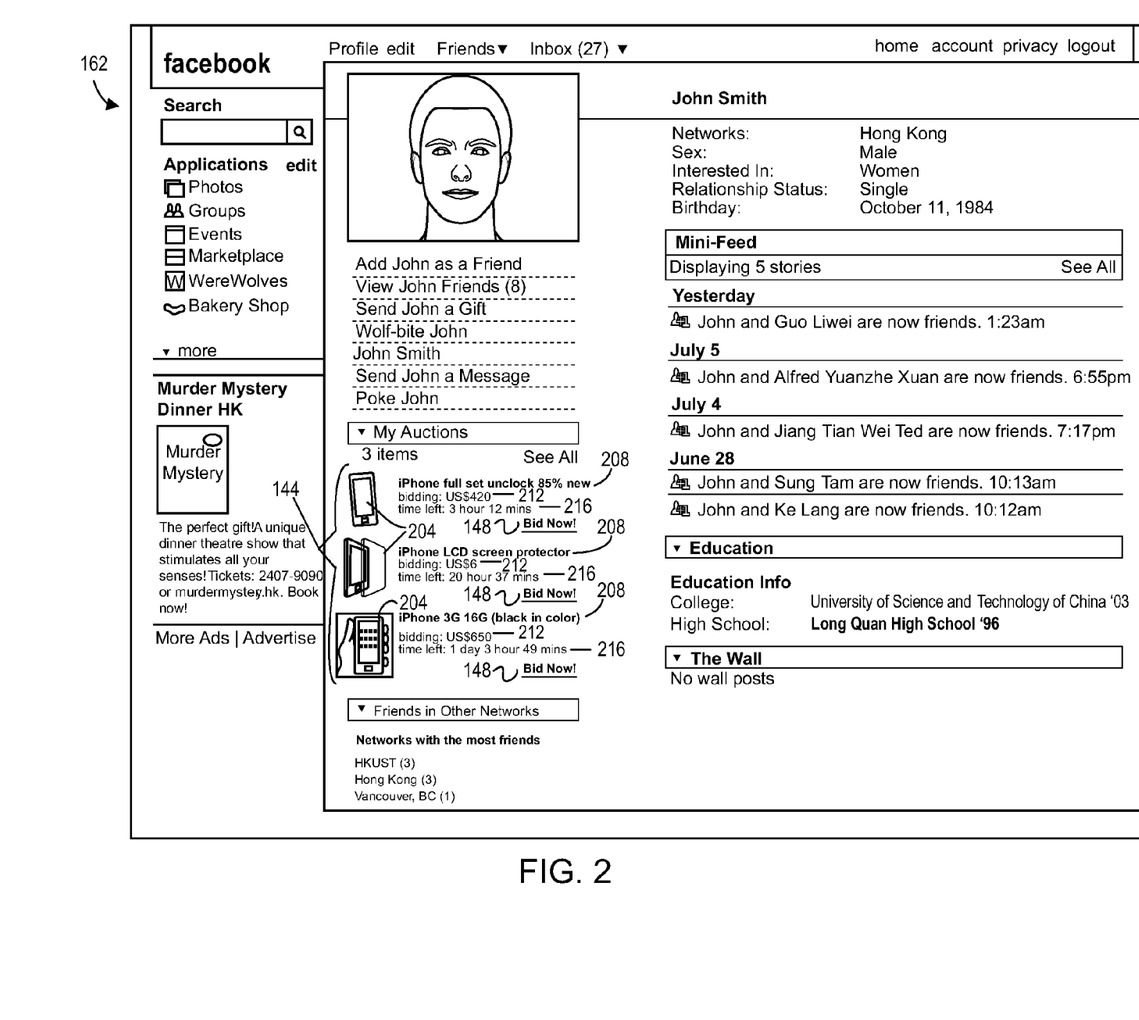
FIG. 2 is a screen shot showing an example of a targeted, in this case third party, website that displays a hypertext media language (HTML) module of an open advertisement for three different iPhone products.

The targeted website server 154 may, through the website formatter 158 and other hardware and software as discussed above, format a targeted website 162 to be hosted on the Internet or Web. The advertisement deliverer 160, which may be coupled with the processor 118 and the website formatter 158, may play its role by delivering (or serving) advertisements to various advertisement locations on the targeted website 162 (FIG. 2). To generate an open advertisement 144 to be served with other advertisements (or served alone), the advertisement deliverer 160 calls the auction API (or other software code) that resides on the auction server 114, e.g., stored in the database 122 thereof, that was created for the auctioned product. This process will be discussed in more detail below. The open advertisement 144 contains information to promote the auctioned product and to link to an auction listing available through the bidding sub-page 132 of the auction website 130. The communication interface 120 of the targeted website server 154 may facilitate local and/or networked communication of the targeted website server 154 with the seller machines 102, the potential bidder machines 106, and the auction server 114.

As will be discussed in more detail, the targeted website server 154 and corresponding targeted websites 162 may include websites of an affiliate service provider of the auction server 114, e.g., Yahoo! or eBay, or may be a third party website hosted outside of the service provider network of the auction server 114.

Figure 6:
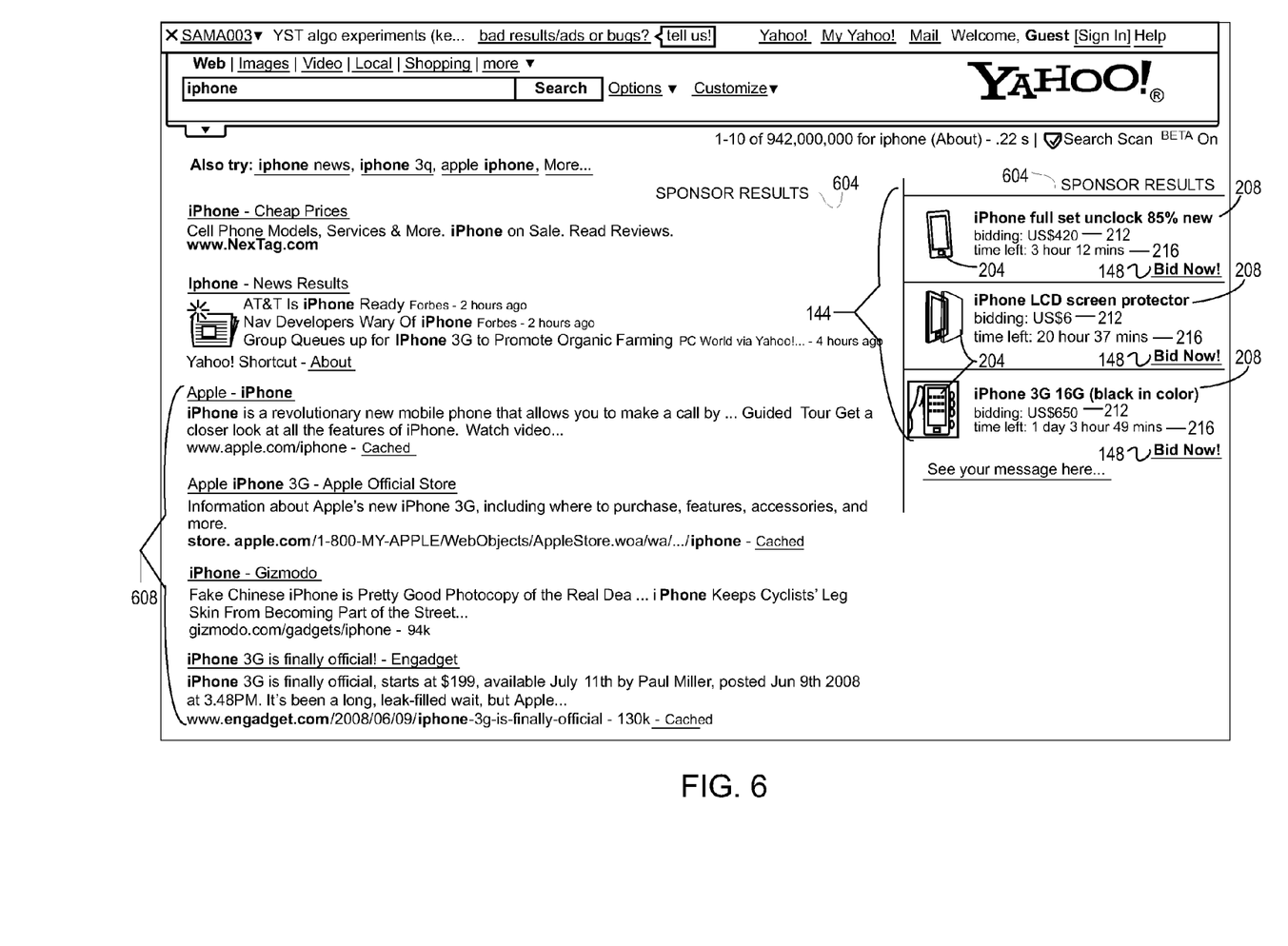
FIG. 6 is a screen shot showing an example of a search results page that displays an HTML module of an open advertisement for three different iPhone products.

The search marketing ads server 134 may, through its search results formatter 138 and other hardware and software as discussed above, format a search results page 142 including a plurality of relevant results, which generally include uniform resource locator (URL) links to each document or webpage within the search results list (FIG. 6). The seller may access a search marketing website (not shown) of the search marketing ads server 134 and sign up to be a search marketing advertiser, if not already done, through an advertising broker such as Yahoo! The search marketing ad server 134 may register the seller, if needed, and create a search user identification (USERID) and/or password for future authenticated access of the seller to the search marketing ads server 134. The search marketing ad server 134 will also prompt the seller to supply information required to produce a sponsored ad listing, only this time, one integrated with the open advertisement 144 of the auctioned product. This information may include, but is not limited to, a method for charging the seller for potential bidder traffic, how much the seller wants to budget for costs per day, a keyword related to the product to be advertised, and product identifications, as available. This information and its use will be discussed in more detail below.

The advertisement deliverer 140 of the search marketing ads server 134 may then play its role by delivering (or serving) advertisements to various advertisement locations on one or more search results pages 142 (FIG. 6). These advertisement locations are generally referred to as sponsored advertisement slots, which historically have been located at the cardinal north, south, and east directions on a search results page 142. To generate an open advertisement 144 to be served with other sponsored advertisements, the advertisement deliverer 140, which may be coupled with the processor 118 and search results formatter 138, calls the auction API that resides on the auction server 114 that was created for the auctioned product. The open advertisement 144 contains information to promote the auctioned product and to link to an auction listing available through the bidding sub-page 132 of the auction website 130. The communication interface 120 may facilitate local and/or networked communication of the search marketing ads server 134 with the seller machines 102, the potential bidder machines 106, and the auction server 114.

FIG. 2 is a screen shot showing an example of a targeted, in this case third party, website 162 that displays the HTML module of an open advertisement 144 for three different iPhone products. This is a third party, targeted website 162 because it is a Facebook page for John Smith, which exists outside of the network including the affiliate service provider of the auction server 114, e.g., Yahoo!, eBay, or Ubid. If, in contrast, the targeted website 162 is hosted by the same service provider as that of the auction server 114, than it would be referred to as an affiliate website 162. Service of the open advertisement 144 to an affiliate website 162 differs somewhat from service of the open advertisement 144 to the third party website 162, which will be made clear shortly with reference to FIGS. 4 and 5.

With further reference to FIG. 2, note that each listing of the open advertisement 144 includes a "Bid Now!" text, each of which includes a separate auction bid hyperlink 148 to the bidding sub-page 132 of the auction website 130 for each respective auction listing. The auction bid link 148 may be variably referred to herein as simply a bid uniform resource locator (URL) 148. Further included in the open advertisement 144 for each auction listing is included a thumbnail 204 of the product image, a descriptive title 208, a bidding price 212, a time left 216 to the end of bidding, and optionally a product URL (not shown). The product URL may be incorporated into the existing features of the open advertisement 144 by creating a hyperlink of one or more of the descriptive titles 208 or thumbnails 204.

Figure 3:
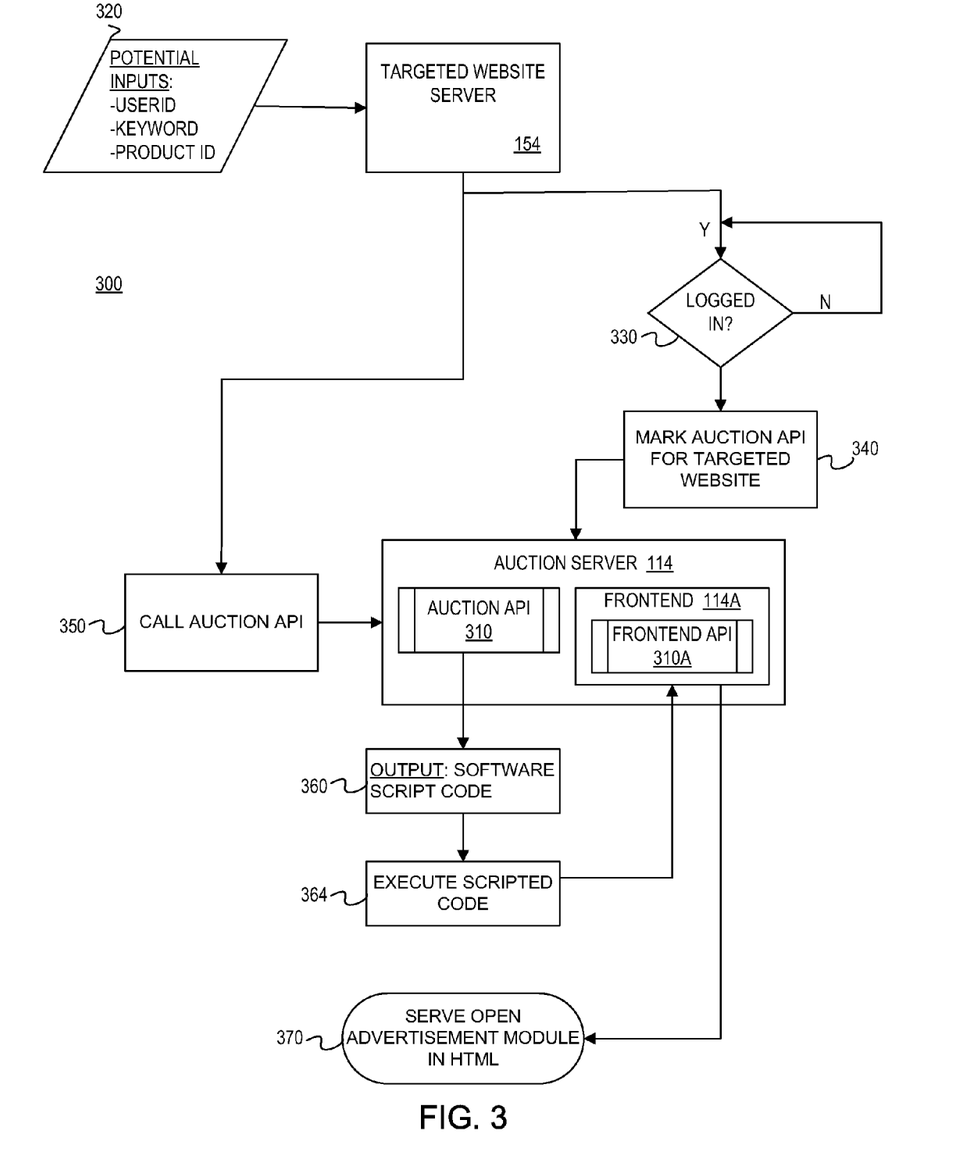
FIG. 3 is a flow chart of an exemplary method for integrating open advertisements with targeted websites served by a targeted website server that calls an auction application programming interface (API).

FIG. 3 is a flow chart 300 of an exemplary method for integrating open advertisements 144 with targeted websites 162 served by a targeted website server 154 that calls an auction application programming interface (API) 310 or other remotely-executable software code. The API 310 may be stored in the database 122 of the auction server 114 or in its memory 116. FIG. 3 is meant to give an overview of integration of open advertisements 144 with targeted websites 162, but is broadened sufficiently so as to also be applicable to aspects of integration thereof with search marketing, as will become apparent with reference to FIG. 7.

At block 320, potential inputs into the targeted website server 154 may include, but are not limited to, a USERID, a password, a keyword, and a product ID. These are used to authenticate a seller with the USERID and/or password, identify a keyword to be associated with a called API 310, or simply identify the product affiliated with the auction listing which is being promoted by the seller. The keyword may be associated with multiple auction-listed products, whereas the product ID is affiliated with a single auction-listed product. At block 330, the auction server 114 and/or the targeted website server 154 verifies login information to authenticate access by the seller to the auction server 114 for purposes of affiliating the API 310 with the products of the seller. Once the seller has logged in, at block 340, the auction server 114 marks the auction API 310 to function with the targeted website 162. In other words, the auction API 310 (or other remotely-executable software code) already exists and will not function (its default) until a software flag is set at block 340, thus marking the auction API 310 to function for a specific product and seller.

At block 350, the targeted website server 154 calls the auction API 310 stored in the auction server 114. The call may be sent with USERID and keywords as inputs. The auction server 114 then creates an output, at block 360, which is sent to the targeted website server 154. The output includes a software code such as may be formed by a scripted, self-executable code such as JavaScript or by any other data interchange format, such as XML-based syndication formats (both referred to generally hereinafter as "scripted code"). The scripted code may include auction product identifications (IDs), which may be encrypted. At about the same time as the output is generated, the auction server 114 may create a frontend API 310A for execution in a frontend 114A of the auction server 114. The frontend and auction API's 310, 310A may be coupled together. Use of the frontend API 310, accordingly, is optional to improve the security of the system, as described below.

At block 364, the scripted code is executed to call the auction server 114 with the encrypted product ID previously entered by the seller. When that call is made, the frontend API 310A may decrypt the encrypted product ID to authenticate access by the targeted website server 154, thus preventing abuse or fraud on the frontend 114A of the auction server 114 by a hacker or the like. The auction API 310, via the frontend API 310A, then returns an open advertisement 144 module in hypertext markup language (HTML), which at block 370, is served to the targeted website 162. The open advertisement 144 module may also be implemented in some other compatible software language. If a submitted keyword is related to more than one auctioned product, then the auction API 310 that is generated is configured to generate scripted code that may create the HTML module such as displayed in FIG. 2, wherein the open advertisement 144 includes each product related to that keyword.

Figure 4:
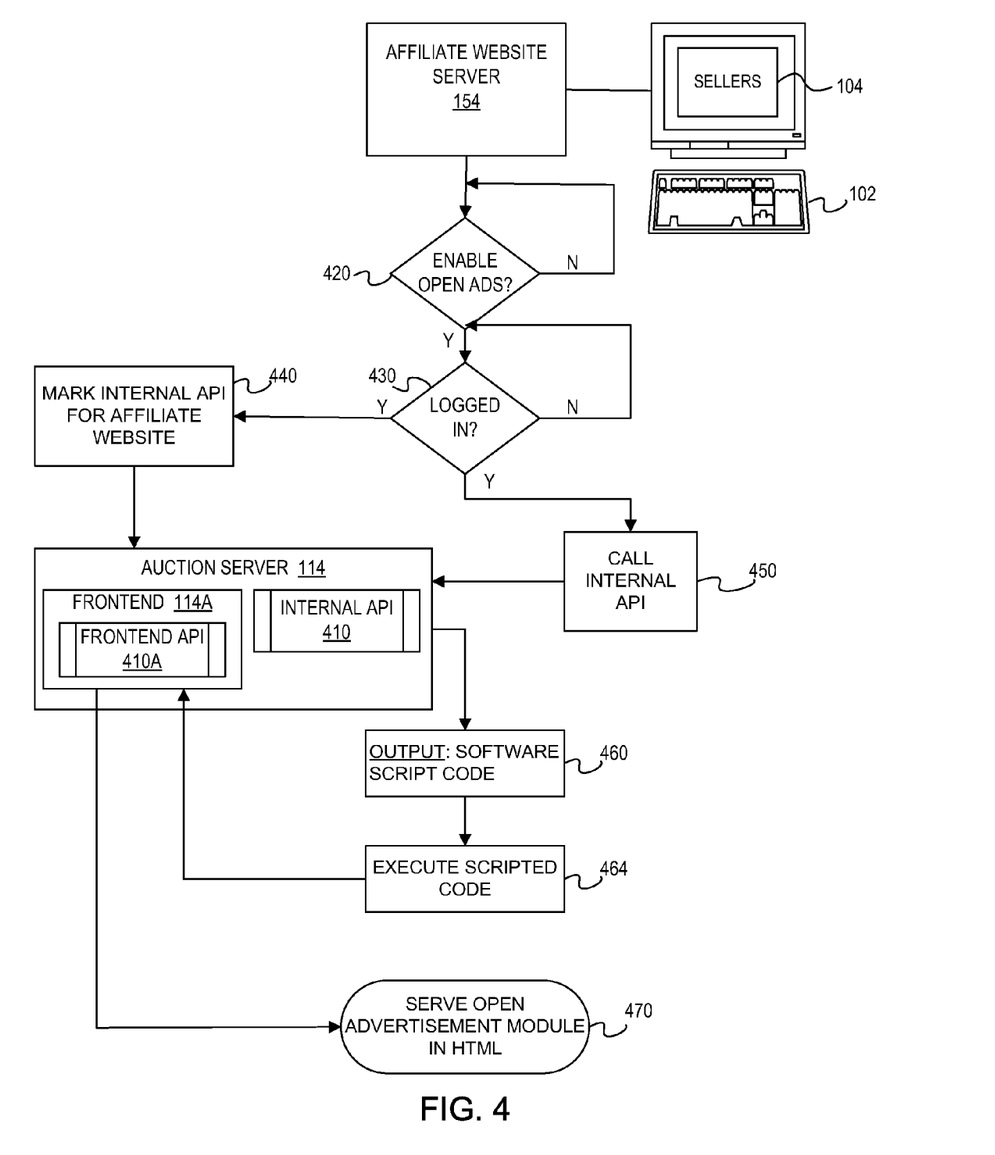
FIG. 4 is a flow chart of an exemplary method for integrating open advertisements with affiliate websites served by an affiliate website server that calls an internal API.

FIG. 4 is a flow chart 400 of an exemplary method for integrating open advertisements 144 with affiliate websites 162 served by an affiliate website server 154 that calls an internal application programming interface (API) 410 or other software code. The internal API 410 may be stored in the database 122 of the auction server 114 or in its memory 116. At block 420, from the browser 104 of the seller machine 102, the seller may access the affiliated website server 154 to enable service of open advertisements 144 to a seller's affiliate website 162. Once enabled, at block 430, the affiliate website server 162 automatically determines whether the seller is logged into the affiliate (or service provider) system. This may be accomplished by matching the USERID and/or password of the seller with that stored by the affiliate system for the seller. The USERID and password used for comparison may be those stored for the current session or those input by the seller when prompted. The login process for the affiliate website server 154 is shared with that of the auction server 114 when a seller logs into either of them. The login process, therefore, may be performed seamlessly across the affiliate system whether originating through the auction server 114 or the affiliate website server 154.

Once the seller is authenticated for access, the login is complete and the flow chart 400 passes to block 440. At block 440, the auction server 114 marks the internal API 410 (or other remotely-executable software code) to function with the affiliate website 162. At block 450, the affiliate website server 154 calls the internal API 410 stored in the auction server 114. The auction server 114 then creates an output, at block 460, which is sent to the affiliate website server 154. The output includes a software code such as may be formed by a scripted, self-executable code such as JavaScript or by any other data interchange format, such as XML-based syndication formats (both referred to generally hereinafter as "scripted code"). The scripted code may include auction product identifications (IDs), which may be encrypted. At about the same time as the output is generated, the auction server 114 may create a frontend API 410A for execution in a frontend 114A of the auction server 114. The frontend and auction API's 410, 410A may be coupled together.

At block 464, the scripted code is executed to call the auction server 114 with the encrypted product ID previously entered by the seller. When that call is made, the frontend API 410A may decrypt the encrypted product ID to authenticate access by the affiliate website server 154, thus preventing abuse or fraud on the frontend 114A of the auction server 114 by a hacker or the like. The auction API 410, via the frontend API 410A, then returns an open advertisement 144 module in hypertext markup language (HTML), which at block 470, is served to the affiliate website 162. The open advertisement 144 module may also be implemented in some other compatible software language.

Figure 5:
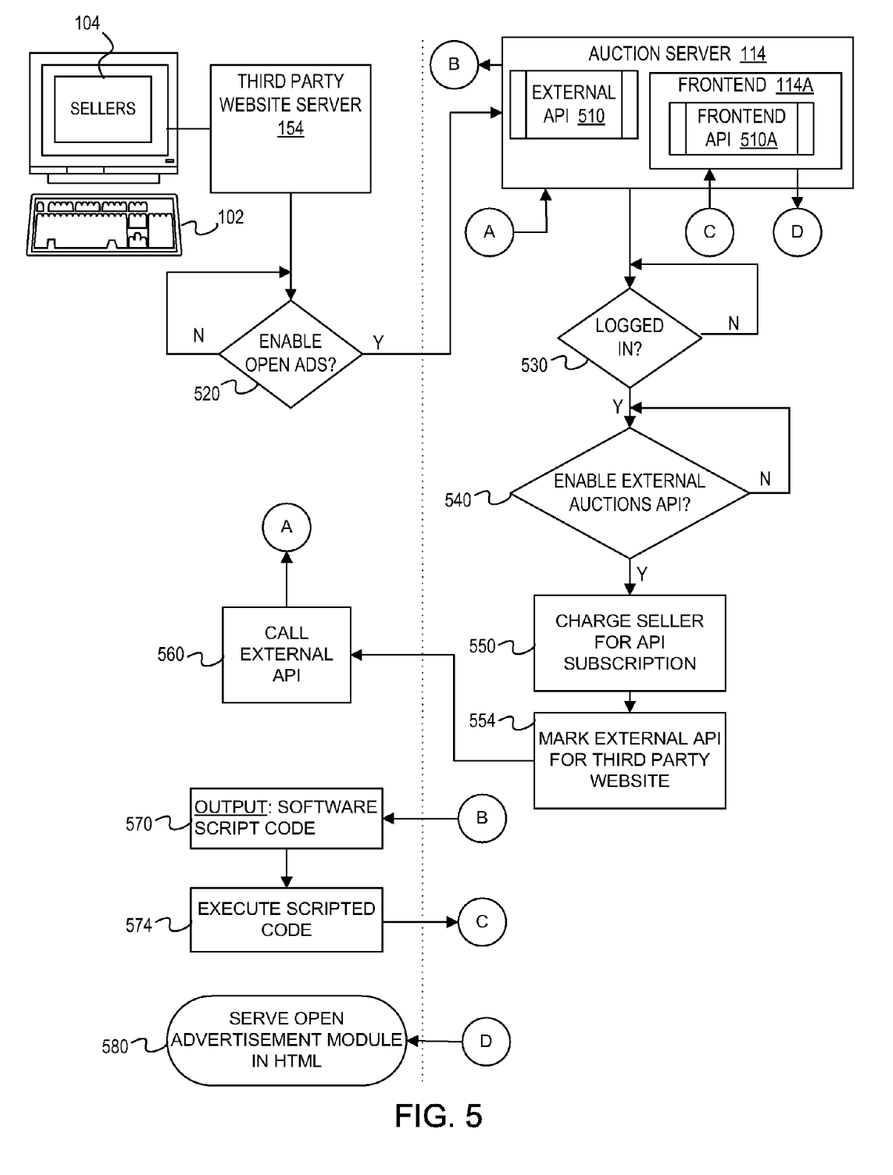
FIG. 5 is a flow chart of an exemplary method for integrating open advertisements with third party websites by a third party website server that calls an external API.

FIG. 5 is a flow chart 500 of an exemplary method for integrating open advertisements 144 with third party websites 162 by a third party website server 154 that calls an external API 510 (or other remotely-executable software code). The external API 510 may be stored in the database 122 of the auction server 114 or in its memory 116. At block 520, from the browser 104 of the seller machine 102, the seller may access the third party website server 154 to enable service of open advertisements 144 to a third party website 162 of a seller. Once enabled, at block 530, the auction server 114 determines whether the seller has logged into the auction website 130 of the auction server 114. This is a separate inquiry that is not automatically performed (in contrast to the method FIG. 4) because the third party server 154 is not a part of the affiliate system of which the auction server 114 is a part. In other words, the login information required by the auction server 114, which still may include a USERID and/or password, may be different than that required by an account management server (not shown) or by a third party website server 154 of the seller that resides outside of the affiliate system.

Once the seller is authenticated for access to the auction server 114, the login is complete and the flow chart 500 passes to block 540. Note, however, while not shown, the auction server 114 may register a first-time seller seeking to post his or her first open advertisement 144 through the auction server 114. At block 540, the auction server 114 determines whether the seller desires to enable the external auction API 510, or other remotely-executable software code. If so, then the auction server 114, at block 550, charges the seller for the subscription to the external API 510, and at block 554, marks the external auction API 510 to function with the third party website 162.

At block 560, the third party website server 154 calls the external API 510 (or other remotely-executable software code) stored in the auction server 114. The auction server 114 then creates an output, at block 570, which is sent to the third party website server 154. The output includes a software script (or scripted code) such as discussed previously, which may include auction product identifications (IDs). The auction product IDs may be encrypted. At about the same time as the output is generated, the auction server 114 creates a frontend API 510A for execution in a frontend 114A of the auction server 114. The frontend and auction API's 510, 510A may be coupled together.

At block 574, the scripted code is executed to call the auction server 114 with the encrypted product ID previously entered by the seller. When that call is made, the frontend API 510A decrypts the encrypted product ID to authenticate access by the third party website server 154, thus preventing abuse or fraud on the frontend 114A of the auction server 114 by a hacker or the like. The auction API 510, via the frontend API 510A, then returns an open advertisement 144 module in hypertext markup language (HTML), which at block 580, is served to a position on the third party website 162. The open advertisement 144 module may also be implemented in some other compatible software language. If a submitted keyword is related to more than one auctioned product, than the auction API 510 that is generated is configured to generate scripted code that may create the HTML module such as displayed in FIG. 2, wherein the open advertisement 144 includes each product related to that keyword.

FIG. 6 is a screen shot showing an example of a search results page 142 that displays an HTML module of an open advertisement 144 for three different iPhone products. The search results page 142 includes sponsored search results 604, which are normally located in slots in the cardinal north, south, and east directions. The search results page 142 also includes, of course, a set of organic (or natural) search results 608. In the slot locations of typical sponsored advertisements 604 at the cardinal east direction are located the open advertisements 144, although the open advertisement 144 may be located in the cardinal north or south directions in alternative embodiments.

As with FIG. 2, the open advertisement 144 includes advertisement listings for three different iPhone products. Note that each listing of the open advertisement 144 includes a "Bid Now!" text, each of which includes a separate auction bid hyperlink 148 to the bidding sub-page 132 of the auction website 130 for each respective auction listing. The auction bid link 148 may be variably referred to herein as simply a bid uniform resource locator (URL) 148. Further included in the open advertisement 144 for each auction listing is included a thumbnail 204 of the product image, a descriptive title 208, a bidding price 212, a time left 216 to end of bid, and optionally a product URL (not shown). The product URL may be incorporated into the existing features of the open advertisement 144 by creating a hyperlink of one or more of the descriptive titles 208 or thumbnails 204.

To generate an open advertisement 144 to be served with other sponsored advertisements, the advertisement deliverer 140, which may be coupled with the processor 118 and search results formatter 138, calls the auction API that resides on the auction server 114, e.g., in the database 122 thereof, that was created for the auctioned product. The communication interface 120 may facilitate local and/or networked communication of the search marketing ads server 134 with the seller machines 102, the potential bidder machines 106, and the auction server 114.

Figure 7:
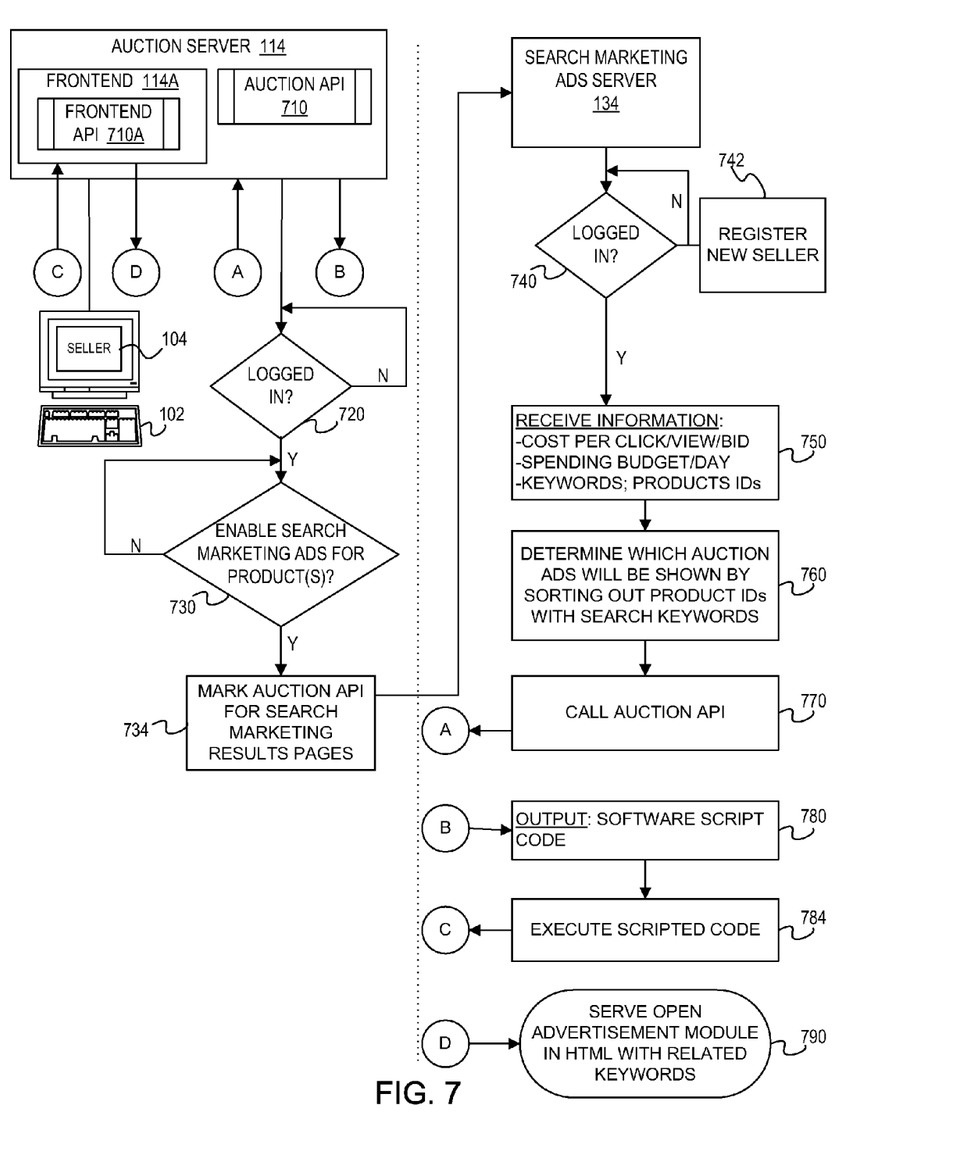
FIG. 7 is a flow chart of an exemplary method for integrating open advertisements with a search marketing ads server to be served with search results pages.

FIG. 7 is a flow chart 700 of an exemplary method for integrating open advertisements 144 with a search marketing ads server 134 to be served with search results pages 142. A seller may, through the seller browser 104 of the seller machine 102, connect with the auction server 114 in which is stored an auction application programming interface (API) 710 as discussed previously. At block 720, the auction server 114 determines whether or not the seller is logged into the auction website 130. As discussed above, this may be accomplished by comparing a USERID and/or password of the seller with the same as stored in the auction server 114. If the seller is logged in, then the auction server at block 730 determines whether or not the seller has enabled search marketing advertisements for one or more products corresponding to one or more auction listings. Once the seller has enabled search marketing advertisements, the auction server 114 marks the auction API 710 to function with the search results pages 142 of the search marketing ads server 134, and generates a product identification (ID) for each of the one or more products enabled for open advertisements. The auction server 114 may also send the product ID for each enabled product to the search marketing ads server 134 for later use.

At block 740, the search marketing ads server 134 determines whether or not the seller has logged into the search marketing ads server 134. If the seller has not yet registered for search marketing through the search marketing ads server 134, the method includes registration of the new seller at block 742. At block 750, the search marketing ads server 134 receives information from the seller through a submission form (not shown), including the cost per click, cost per view, or cost per bid, depending on how the seller chooses to be charged for potential bidders accessing the open advertisement 144 on the search results pages 142. In other words, the seller may choose to be charged for the open advertisement 144 and bid link 148 on a basis of pay-per-click (PPC), pay-per-thousands of views or impressions (CPM), or on pay-per-bid (PPB) basis. The information received from the seller may also include the amount of budget that may be spent each day, one or more keywords associated with each open advertisement 144 auction listing, and a product identification (ID) associated with each auctioned product if not already sent directly by the auction server 114.

At block 760, the search marketing ads server 134 determines which auction advertisement listings are to be shown by sorting out product IDs with search keywords. As discussed earlier, if a keyword is associated with more than one product of the seller, the open advertisement 144 generated by way of the auction API 710 will include auction listings information for each auctioned listing. If only one or more specific products IDs are to be associated with the open advertisement 144, then the auction API 710 may ignore the keywords and generate a scripted code to create an open advertisement 144 associated with only designated products IDs.

At block 770, the search marketing ads server 134 calls the auction API 710 (or other remotely-executable software code) stored on the auction server 114. At block 780, the search marketing ads server 134 receives the output of the auction server 114, including a scripted code generated by the auction API 710. As discussed above, the scripted code may include JavaScript or any other data interchange format, such as XML-based syndication formats. The scripted code may include auction product identifications (IDs), which may encrypted. At about the same time as the output is generated, the auction server 114 may create a frontend API 710A for execution in a frontend 114A of the auction server 114. The frontend and auction API's 710, 710A may be coupled together.

At block 784, the scripted code is executed to call the auction server 114 with the encrypted product ID previously entered by the seller. When that call is made, the frontend API 710A may decrypt the encrypted product ID to authenticate access by the search marketing ad server 134, thus preventing abuse or fraud on the frontend 114A of the auction server 114 by a hacker or the like. The auction API 710, via the frontend API 710A, then returns an open advertisement 144 module in hypertext markup language (HTML) or in some other compatible software language. At block 790, the HTML module is served to the sponsored advertisement slots as the open advertisement 144 (FIG. 6).

The displayed open advertisement 144 includes three different iPhone products, and each respective set of auction-listed information, including the URL bid link 148 to the bidding sub-page 132 of the auction website 130 for each product. When a potential bidder selects the URL bid link 148, it redirects the potential bidder browser 108 to the biding sub-page 132 of the auction website 130. The open advertisement 144 of FIG. 6 is but one example where different products may all be affiliated with the same keyword, and therefore be served together as a single advertisement.

Figure 8:
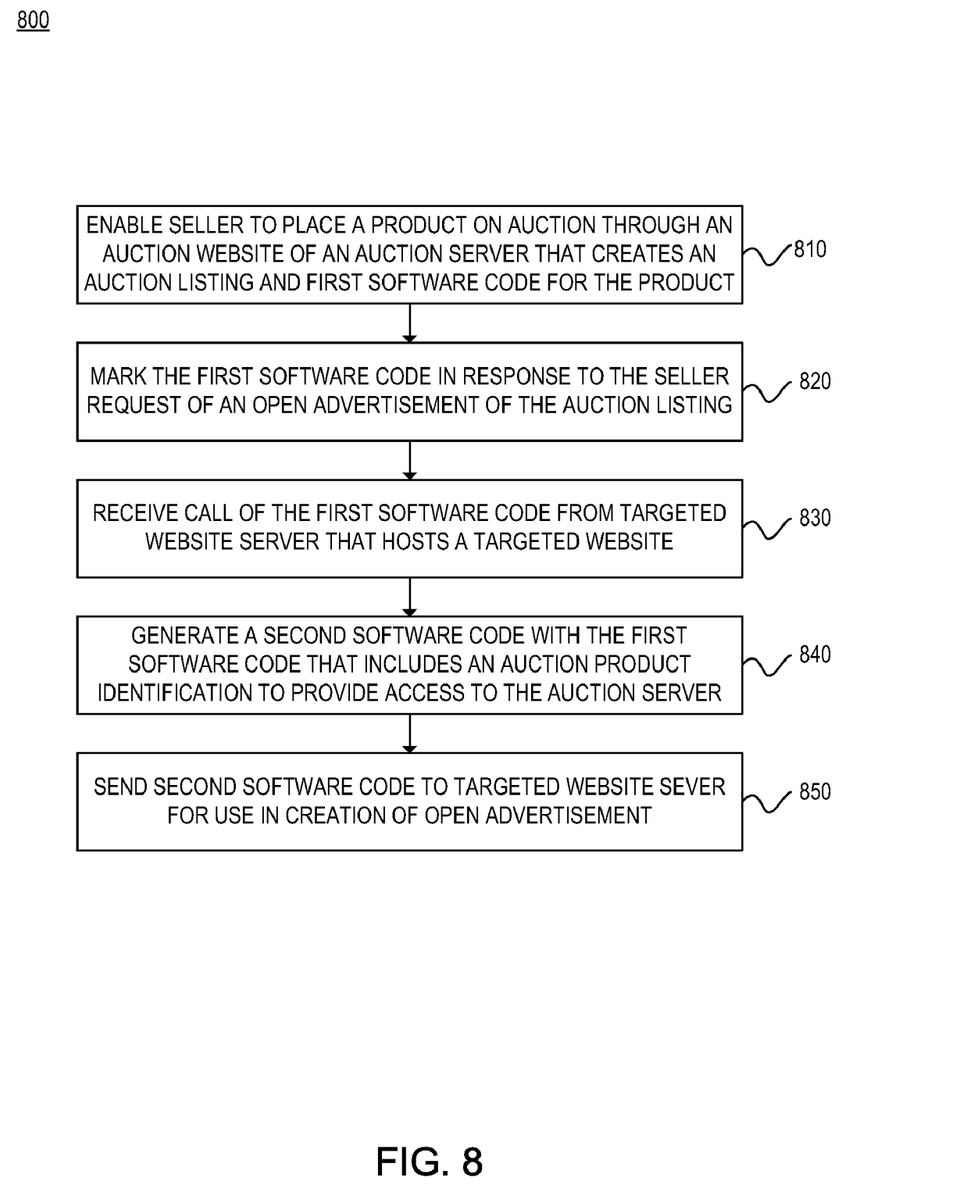
FIG. 8 is a flow chart of an exemplary method for integrating open advertisements of auction listings with a targeted website in e-commerce.

FIG. 8 is a flow chart 800 of an exemplary method for integrating open advertisements 144 of auction listings with a targeted website 162 in e-commerce. At block 810, the method enables a seller, over a network 110 with an online auction server 114, to place a product on auction through an auction website 130, wherein the auction server 114 creates an auction listing for the product together with a first software code affiliated with the auction listing. At block 820, the auction server 114 marks the first software code to function with the targeted website 162 in response to the seller requesting an open advertisement of the auction listing. At block 830, the auction server 114 receives a call of the first software code from a targeted website server 154 that hosts a targeted website 162. At block 840, the auction server 114 generates a second software code with the first software code, wherein the second software code includes an auction product identification to provide access to the auction server 114. At block 850, the auction server 114 sends the second software code to the targeted website server, wherein the second software code is configured to create the open advertisement that displays specific information related to the auction listing to be served to an advertisement position of the targeted website 162. The first software code may include API code or other remotely-executable code. The second software code may include a scripted or other self-executable code. The auction product identification may be encrypted to provide authenticated access to the auction server.

Figure 9:
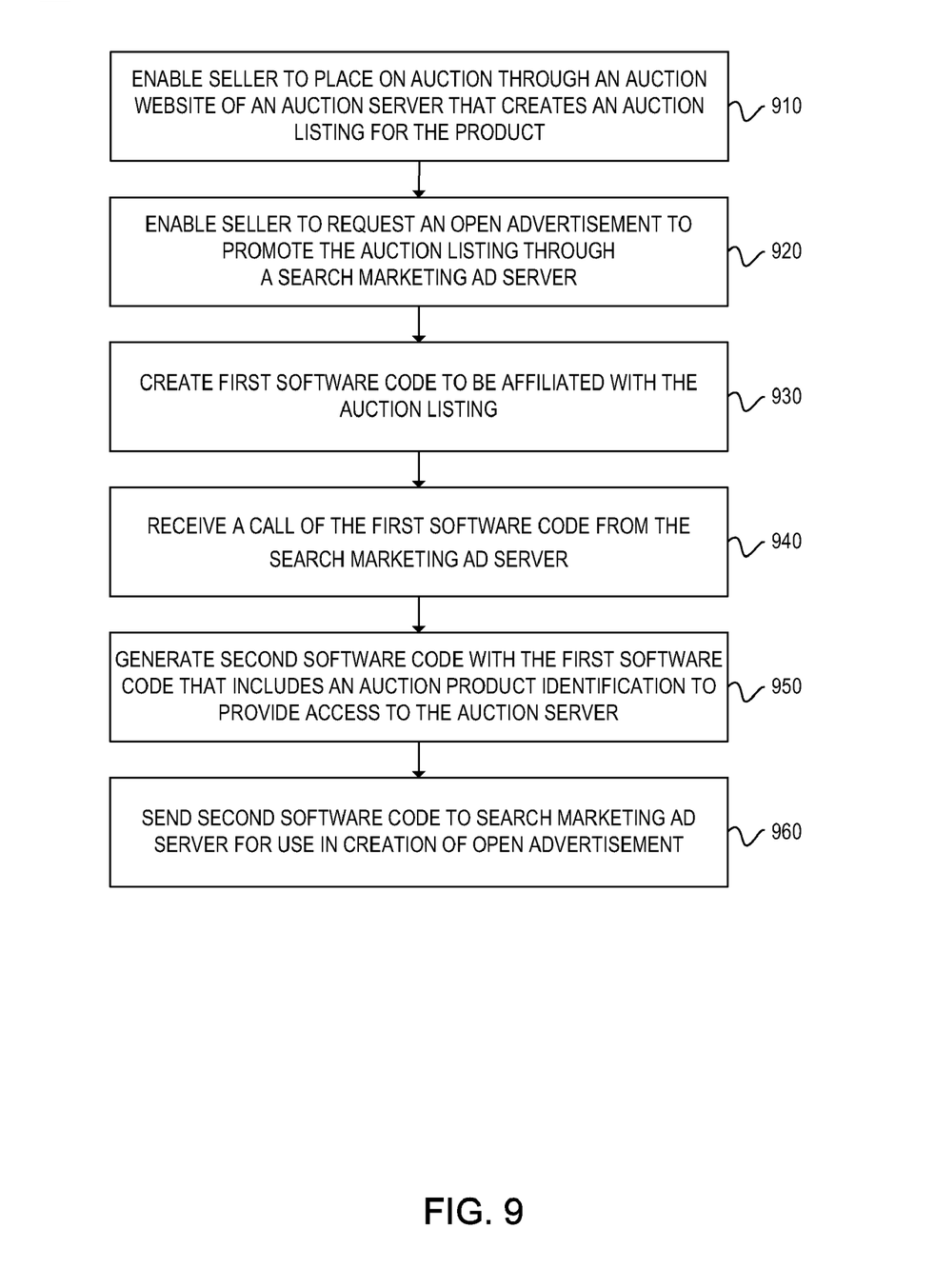
FIG. 9 is a flow chart of an exemplary method for integrating open advertisements of auction listings with a search results page in e-commerce.

FIG. 9 is a flow chart 900 of an exemplary method for integrating open advertisements 144 of auction listings with a search results page 142 in e-commerce. At block 910, the method enables a seller, over a network 110 with an online auction server 114, to place a product on auction through an auction website, wherein the auction server 114 creates an auction listing for the product. At block 920, the auction server 114 enables the seller to request an open advertisement 144 to promote the auction listing through a search marketing ad server 134, which serves advertisements to search results pages 142. At block 930, the auction server 114 creates a first software code to be affiliated with the auction listing. At block 940, the auction server 114 receives a call of the first software code from the search marketing ad server 134. At block 950, the auction server 114 generates a self-executable code with the first software code, wherein the self-executable code includes an auction product identification to provide access to the auction server 114. At block 960, the auction server 114 sends the self-executable code to the search marketing ad server 134, wherein the self-executable code is configured to create the open advertisement 144 that displays specific information to be served to an advertisement position of a search results page 142. The first software code may include API code or other remotely-executable code. The auction product identification may be encrypted to provide authenticated access to the auction server.

In the foregoing description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts, or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

The invention claimed is:

1. A computer-implemented method for integration of open advertisements with targeted websites, the method comprising:
    enabling a seller, over a network with an online auction server, to place a product on auction through an auction website, wherein the auction server creates an open advertisement comprising an auction listing for the product and a first software code affiliated with the auction listing, the first software code comprising a remotely-executable software code;
    marking the first software code to function with a targeted website in response to the seller requesting an open advertisement of the auction listing;
    receiving a remote server call of the software code from a targeted website server that hosts the targeted website;
    generating a second software code by the first software code in response to receiving the call, wherein the second software code includes self-executable, scripted code and an auction product identification to provide access to the auction server; and
    sending the second software code to the targeted website server, wherein the second software code is configured for execution by the targeted website server to create the open advertisement that displays specific information related to the auction listing to be served to an advertisement position of the targeted website in response to a potential bidder browsing to the targeted website; and
    delivering the open advertisement as a web-compatible module for display in the advertisement position.

2. The method of claim 1, wherein the targeted website is an affiliate website of the online auction server, the method further comprising:
    verifying an affiliate login user identification (USERID) of the seller before receiving the call of the first software code from an affiliate website server, wherein the first software code comprises an internal application programming interface (API) code.

3. The method of claim 2, wherein the seller has a plurality of auction listings for a plurality of products, the method further comprising:
    receiving a keyword from the seller associated with each of at least some of the plurality of auction listings; and
    enabling the seller to choose a keyword for service of the open advertisement, wherein the second software code creates an open advertisement that includes each product related to the keyword.

4. The method of claim 1, wherein the targeted website is a third party website, the method further comprising:
    verifying an auctions site login user identification (USERID) and password of the seller before receiving the call of the first software code from the third party website, wherein the first software code comprises an external application programming interface (API) code.

5. The method of claim 4, wherein the seller has a plurality of auction listings for a plurality of products, the method further comprising:
receiving a keyword from the seller associated with each of at least some of the plurality of auction listings; and
enabling the seller to choose a keyword for service of the open advertisement, wherein the second software code creates an open advertisement that includes each product related to the keyword.

6. The method of claim 1, wherein the specific information displayed by the open advertisement comprises one or more of: a thumbnail of the product, a title or description of the product, an instant bid price, a time left from the end of an auction, a bid uniform resource locator (URL) that links to the auction listing, a product URL that links to product information, and a combination thereof.

7. The method of claim 6, further comprising:
redirecting a web browser of the potential bidder to the auction listing of the auction website in response to the potential bidder engaging the bid URL of the open advertisement.

8. The method of claim 6, further comprising charging the seller for any one or both of:
each engagement of the bid URL by one or more potential bidders; and
each successful bid by potential bidders that link to the auction listing of the auction website.

9. The method of claim 1, further comprising:
causing the second software code to call the auction server with the auction product identification in response to the potential bidder browsing to the targeted website, wherein the auction product identification is encrypted and the web-compatible module comprises a hypertext markup language (HTML) module for display in the advertisement position.

10. The method of claim 1, further comprising:
enabling the seller to request the open advertisement be served to a plurality of targeted websites; and
charging the seller for each of the targeted websites that calls the first software code to generate the open advertisement on each respective targeted website.

11. A system for integration of open advertisements with targeted websites, comprising:
an online auction server to enable a seller, over a network, to place a product on auction through an auction website, wherein the auction server creates an open advertisement comprising an auction listing for the product, the auction server including:
a memory;
a processor coupled with the memory;
a communication interface coupled with the processor and the memory;
a software code generator coupled with the processor and configured to create a remotely-executable first software code in response to the creation of an auction listing for the product;
wherein the communication interface receives a remote server call of the first software code from a targeted website server that hosts a targeted website;
wherein the processor is configured to generate a second software code with the first software code in response to receipt of the call, wherein the second software code includes self-executable, scripted code and an auction product identification (ID) to provide access to the auction server; and
wherein the communication interface:
sends the second software code to the targeted website server, wherein the second software code is configured for execution by the targeted website server to create the open advertisement that displays specific information related to the auction listing to be served to an advertisement position of the targeted website in response to a potential bidder browsing to the targeted website; and
delivers the open advertisement as a web-compatible module for display in the advertisement position.

12. The system of claim 11, wherein the targeted website server submits the product ID to the auction server upon execution of the second software code, wherein the product ID is encrypted, and wherein the software code generator generates a frontend application programming interface (API) to decrypt the encrypted product ID to authenticate access to the auction server by the targeted website server.

13. The system of claim 11, wherein the targeted website is an affiliate website of the online auction server, wherein the processor and communication interface are configured to:
verify an affiliate login user identification (USERID) of the seller before receiving the call of the first software code from an affiliate website server, wherein the first software code comprises an internal application programming interface (API) code; and
set a flag of the internal API code to function with the affiliate website.

14. The system of claim 13, wherein the seller has a plurality of auction listings for a plurality of products, wherein the processor and communication interface are configured to:
receive a keyword from the seller associated with each of at least some of the plurality of auction listings; and
enable the seller to choose a keyword for service of the open advertisement,
wherein the second software code creates an open advertisement that includes features drawn to each product related to the keyword.

15. The system of claim 11, wherein the targeted website is a third party website, and the processor and communication interface are configured to:
verify an auctions site login user identification (USERID) and password of the seller before receiving the call of the first software code from the third party website, wherein the first software code comprises an external application programming interface (API) code; and
set a flag of the external API to function with the third party website.

16. The system of claim 15, wherein the seller has a plurality of auction listings for a plurality of products, wherein the processor and the communication interface are configured to:
receive a keyword from the seller associated with each of at least some of the plurality of auction listings; and
enable the seller to choose a keyword for service of the open advertisement,
wherein the second software code creates an open advertisement that includes each product related to the keyword.

17. The system of claim 11, wherein the specific information displayed by the open advertisement comprises one or more of: a thumbnail of the product, a title or description of the product, an instant bid price, a time left from the end of an auction, a bid uniform resource locator (URL) that links to the auction listing, a product URL that links to product information, and a combination thereof.

18. The system of claim 17, wherein the processor is configured to charge the seller for any one or both of:
   each engagement of the bid URL by one or more potential bidders; and
   each successful bid by potential bidders that link to the auction listing of the auction website.

19. The system of claim 11, wherein the processor is configured to:
   cause the second software code to call the auction server with the auction product ID in response to the potential bidder browsing to the targeted website; wherein the web-compatible module comprises a hypertext markup language (HTML) module for display in the advertisement position.

* * * * *